United States Patent
Kawabata et al.

[11] 3,817,151
[45] June 18, 1974

[54] POWER STEERING DEVICE

[75] Inventors: Minoru Kawabata, Ogawa; Keiiti Nakamura, Kariya, both of Japan

[73] Assignee: Toyoda Koki Kabushiki Kaisha, Kariya-shi, Japan

[22] Filed: May 8, 1973

[21] Appl. No.: 358,450

[30] Foreign Application Priority Data
May 13, 1972 Japan.............................. 47-47457
May 13, 1972 Japan.............................. 47-47458

[52] U.S. Cl....................... 91/375, 91/420, 138/46
[51] Int. Cl.............................................. F15b 9/10
[58] Field of Search................ 91/375 A, 375, 420; 138/46

[56] References Cited
UNITED STATES PATENTS
3,043,276  7/1962  Thompson et al..................... 91/420
3,489,172  1/1970  Whitmore............................. 138/46

FOREIGN PATENTS OR APPLICATIONS
1,291,225  3/1969  Germany......................... 91/375 A

*Primary Examiner*—Edgar W. Geoghegan
*Assistant Examiner*—W. F. Woods
*Attorney, Agent, or Firm*—Oblon, Fisher, Spivak, McClelland & Maier

[57] ABSTRACT

A power steering device having a servo-valve for distributing fluid under pressure to a power cylinder unit connected to the servo-valve and serving to steer a vehicle, and comprising a variable restrictor in which a coil spring is provided across an outlet passage through which the fluid from the servo-valve is led to a reservoir. The coil spring variable restrictor is provided in the outlet passage perpendicular thereto and is actuated in response to the steering actuation for applying a back pressure so as to prevent a restriction noise which usually is generated in servo-valves when the same are actuated.

8 Claims, 9 Drawing Figures

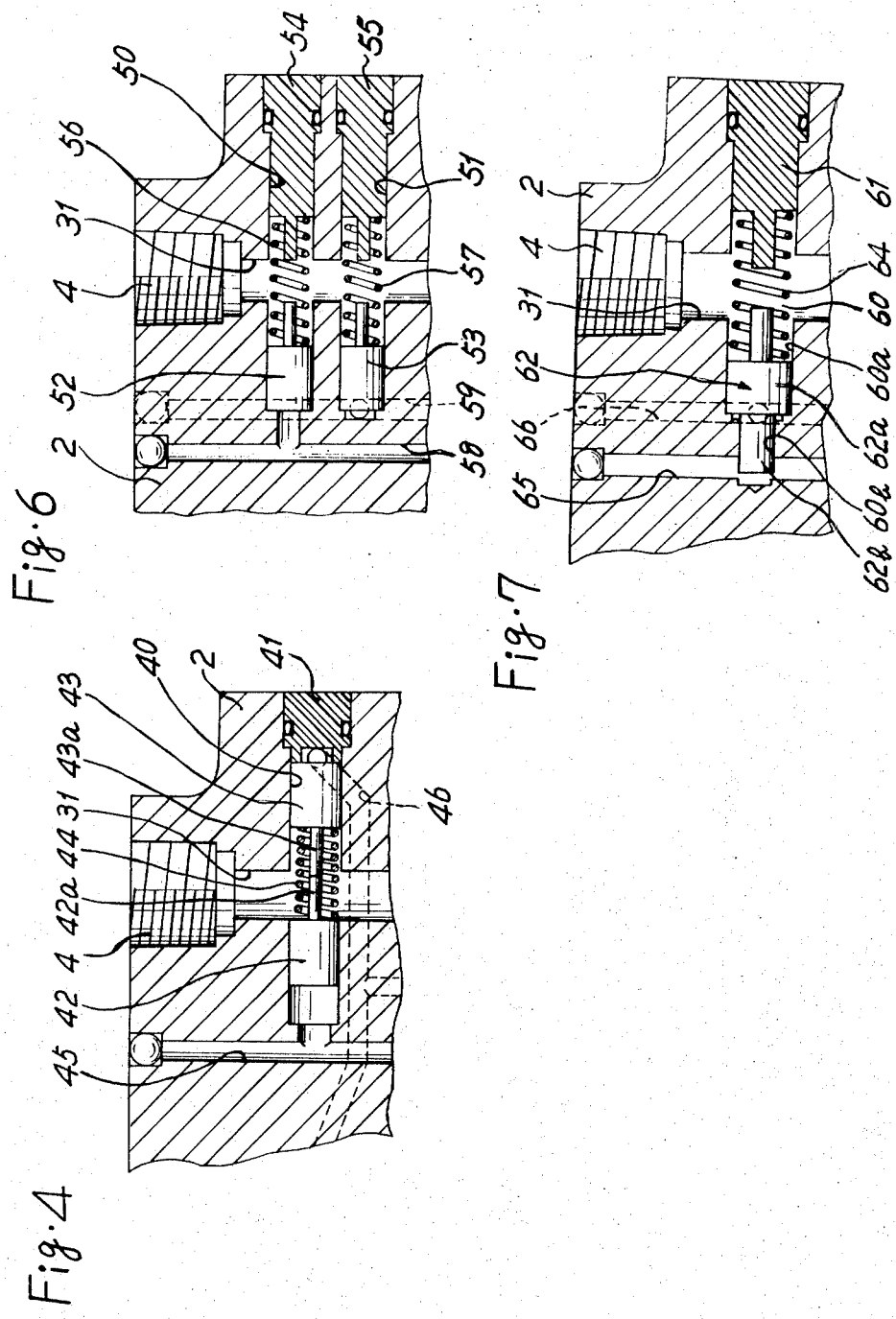

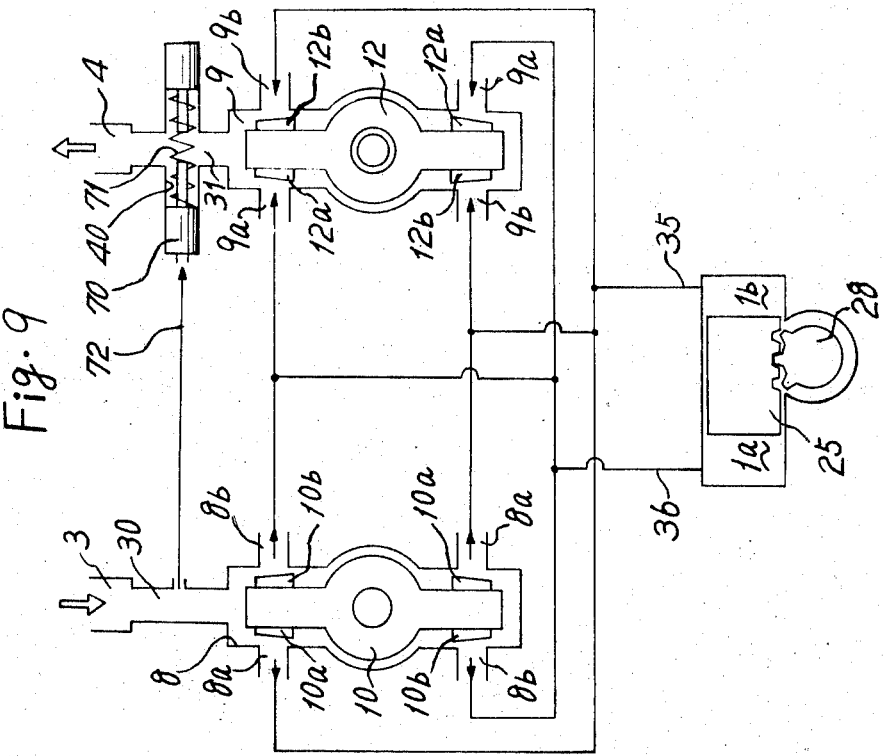

POWER STEERING DEVICE

BACKGROUND OF THE INVENTION

The present invention relates generally to power steering devices having means for preventing a noise generated in a servo-valve of the power steering device.

In conventional power steering devices, when the steering wheel of the vehicle is rotated or turned, and a servo-valve connected thereto is actuated for moving a power cylinder, a noise is apt to be generated in the servo-valve. For example, in a power steering device having a servo-valve of the flap-valve type, the flap-valve mechanism controls the distribution of pressurized fluid being supplied from a pump to the power cylinder and simultaneously the bleed-off of the fluid to the reservoir. In this type flap-valve mechanism, the flap-valve member closely approaches the outlet openings, whereby the volume of the fluid flowing through the outlet openings is restricted, and because of this restriction effect, the pressure of the fluid in the openings is rapidly increased. The valve chamber of the power cylinder is connected with the reservoir through the outlet passage and therefore the highly pressurized fluid is ejected into the valve chamber through the clearance between the valve seats of the flap valve members and the outlet openings. Thus, a cavitation phenomena is caused around the valve seats and therefore, cavities and noise, that is, restriction noise, are generated. Accordingly, there are some defects in the prior art devices in that the cavity affects the stability of the power steering and the driver may be caused to feel uncomfortable because of the restriction noise which he hears.

SUMMARY OF THE INVENTION

Accordingly it is the primary object of the present invention to provide an improved power steering device, wherein the restriction noise characteristic of prior art devices is prevented.

The foregoing and other objects are obtained in accordance with one aspect of the present invention through the provision in a power steering device having a hydraulic power cylinder means serving to assist in steering the tires of the vehicle and a servo-valve means connected to the hydraulic power cylinder means serving to distribute fluid under pressure to the hydraulic power cylinder means in response to movement of a steering wheel, the servo-valve means having inlet and outlet passages respectively connected with a hydraulic source and a reservoir, the improvement comprising piston member means slidably mounted in valve cylinder means provided across the outlet passage, a coil spring means disposed in the valve cylinder means across the outlet passage and being compressible by the piston member means for restricting fluid flow through the outlet passage, and means serving to move the piston member means for compressing the coil spring means when the steering wheel is manipulated.

BRIEF DESCRIPTION OF THE DRAWINGS

Various other objects, features and attendant advantages of the present invention will be more fully appreciated as the same becomes better understood from the following detailed description of a preferred embodiment of the present invention when considered in connection with the accompanying drawings in which:

FIG. 4 is a sectional view of an enlarged scale taken along the line IV — IV of FIG. 1;

FIG. 6 is a sectional view corresponding to FIG. 4 of a modification of the present invention;

FIG. 7 is a view corresponding to FIG. 4 of another modification;

FIG. 8 shows a sectional view of a part of still another embodiment corresponding to FIG. 4 of the present invention; and FIG. 9 is a hydraulic circuit adopted to the device shown in FIG. 8.

DETAILED DESCRIPTION OF THE PREFERRED EMBODIMENTS

Figure 1:
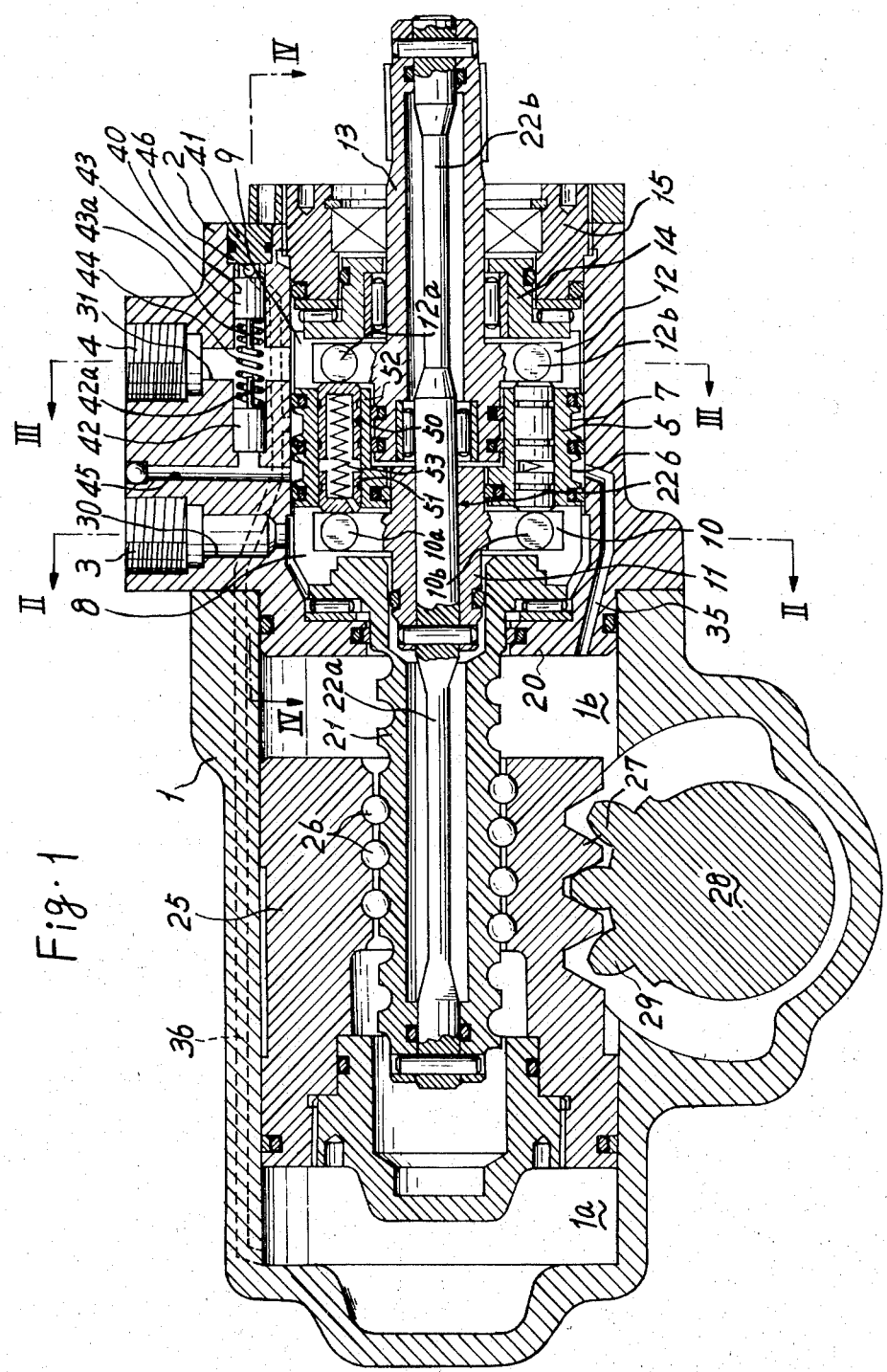
FIG. 1 is a sectional view of a power steering device embodying the subject matter of the present invention.

Referring now to the drawings, wherein like reference numerals designate indentical or corresponding parts throughout the several views, and more particularly to FIG. 1 thereof, a cylinder body 1 which is a base body of the power steering device is shown having a valve housing 2 secured thereto at one end. The valve housing 2 has a radial inlet port 3 and a radial outlet port 4 for the fluid under pressure being spaced apart a predetermined distance along the axial direction thereof. Rotatably held in the valve housing is a valve body 5, on the periphery of which two longitudinally spaced recesses 6 and 7 are provided. On both axial ends of the valve body 5, valve chambers 8 and 9, in which flap-valve members are mounted, are respectively provided extending in a radial direction of the valve body 5 and being sealingly separated from each other. A pair of first flap valve members 10 project radially from a valve shaft 11 and a pair of second flap valve members 12 project radially from a steering shaft 13, the first and second flap-valve members 10 and 12 being in the valve chambers 8 and 9, with one end of each of the shafts 11 and 13 being rotatably mounted in the valve body 5. At one side of the valve body 5, a supporting member 14, which is rotatably mounted on a sealing member 15 securedly mounted on one end of the valve housing 2, is positioned coaxially relative to the valve body 5 and is engaged therewith. The steering shaft 13 is rotatably supported by the supporting member 14 through a suitable bearing. Another end of the steering shaft 13 extends through the sealing member 15 secured on one end of the valve housing 2 and is connected to a steering handle or wheel through coupling members and the like so as to be able to be rotated or turned by a driver or operator of the vehicle.

A screw shaft 21 is rotatably supported by a partition wall 20 provided on the other end of the valve housing 2 and extends to the hydraulic cylinder 1 through the partition wall 20. The base end of the screw shaft 21 is engaged with the valve chamber 8 and, therefore, the valve body 5 and the screw shaft 21 are moved as one body. A double torsion bar 22 is inserted in the screw shaft 21, valve shaft 11 and steering shaft 13, and one end, the middle portion and another end of the double torsion bar 22 are respectively fixed at an end portion of the screw shaft 21, the valve shaft 11 and the extending end of the steering shaft 13 by pins. The double torsion bar 22 has a first torsion bar 22a which has a relatively small spring constant and by which the screw shaft 21 is elastically connected to the valve shaft 11, and a second torsion bar 22b, of which the spring constant is larger than that of the first torsion bar 22a, which connects the steering shaft 13 elastically to the valve shaft 11.

A piston 25 slidably fits in the cylinder 1, and threadedly engages the screw shaft 21 therein through a series of balls 26. On an outer surface of the piston 25, a rack 27 is axially formed which engages a sector gear 29 provided on a cross-shaft 28 which in turn is rotatably supported on the cylinder body 1 and is mounted in a direction perpendicular to the direction of sliding movement of the piston 25 in the cylinder body 1. To one end of the cross-shaft 28 there is connected a pitman arm, not shown, which is connected to the steered tires of the vehicle through a link mechanism constructed by a tie-rod, a knuckle-arm and the like and is moved by the reciprocating movement of the piston 25.

Figure 3:
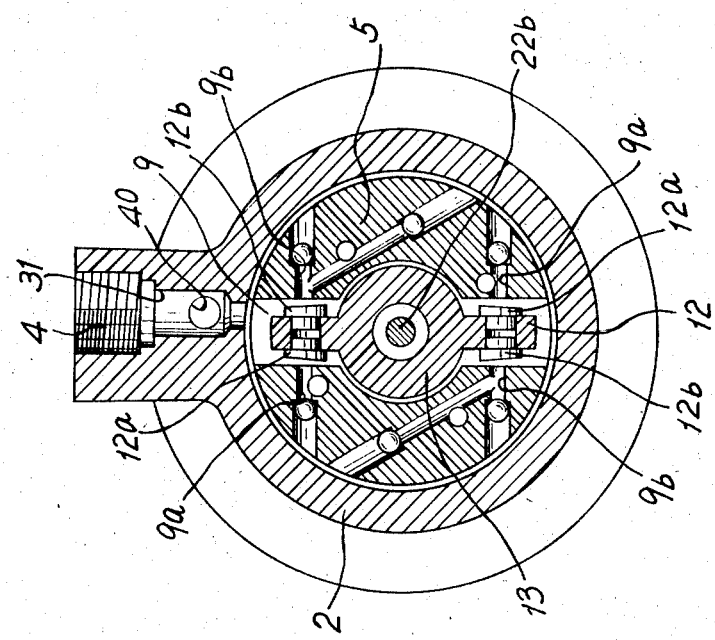
FIG. 3 is a cross-section view taken along the line III — III of FIG. 1.
Figure 2:
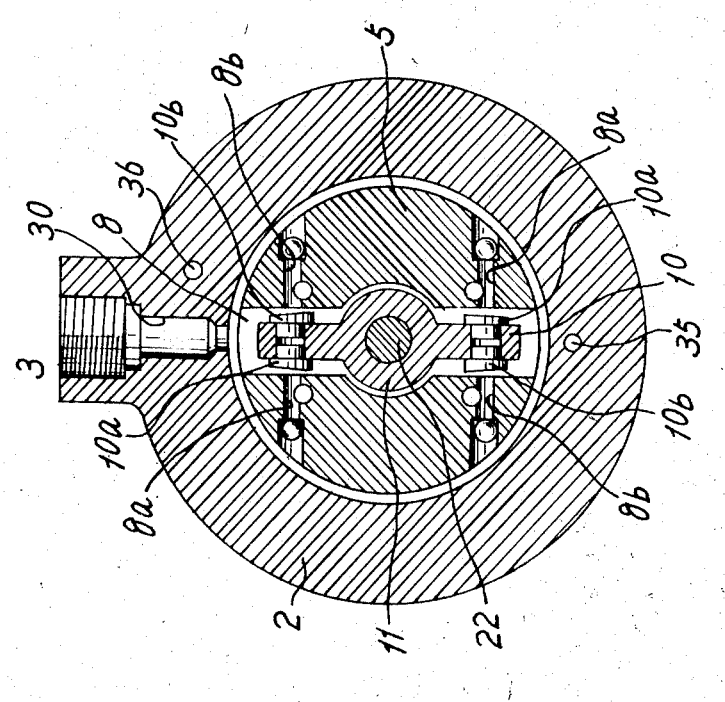
FIG. 2 is a cross-section view taken along the line II — II of FIG. 1.

As shown in FIG. 2, the valve chamber 8, in which the first flap valve members 10 are provided, is connected with the inlet port 3 through a passage 30 in the valve housing 2. Two pairs of inlet openings 8a, 8b formed on the valve body 5 are opened to the chamber 8 against the valve seats 10a, 10b projected on the both sides of the first flap members 10. There respectively exist predetermined clearances between the valve seats 10a, 10b and the inlet openings. On the other hand, the chamber 9, as shown in FIG. 3, is connected with the outlet port 4 through a passage 31 in the valve housing 2. To this valve chamber 9, two pairs of outlet openings 9a, 9b formed in the valve body 5 are opened against two pairs of the valve seats 12a, 12b projectedly provided on the both sides of the second flap member 12. There are respectively formed clearances between the valve seats 12a, 12b and the outlet openings, which clearances are a little larger than that of the first flap valve members 10.

Figure 5:
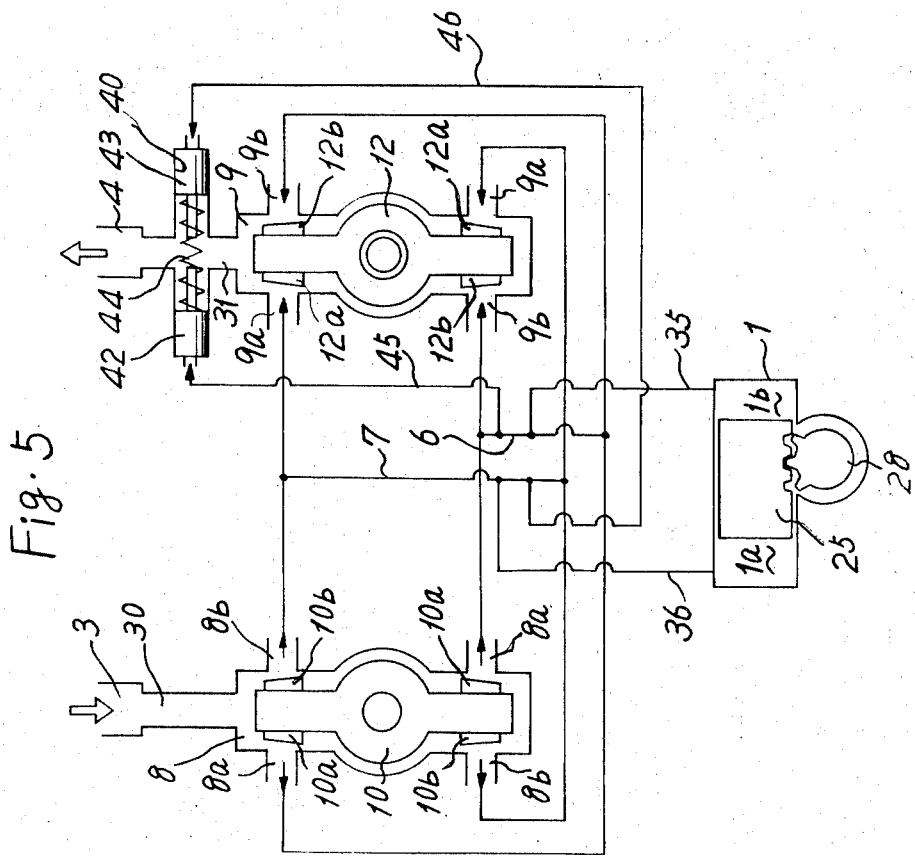
FIG. 5 shows a hydraulic system of the present invention.

Each of the inlet openings 8a is connected with the outlet openings 9b by passages, not shown, formed in the valve body 5, as shown schematically in FIG. 5, and is also connected with a right chamber 1b of the hydraulic cylinder 1 through the annular recess 6 and a passage 35, as shown also in FIG. 1. Moreover, each of the inlet openings 8b is connected with the outlet openings 9a by passages, also as shown in FIG. 5, and is also connected with a left chamber 1a of the hydraulic cylinder 1 through the annular recess 7 and a passage 36, shown in phantom in FIG. 1.

The valve body 5 is provided with bores 50 in an axial direction thereof, in each of which a pair of plungers 51, 52 are slidably mounted. A compressed spring 53 is provided between each of the plungers 51, 52 and the plungers 51, 52 are pressed against the inner side surfaces of the first and second flap valve members 10, 12 by the compressive force of the spring for damping or attenuating the vibration of each of the flap valve members 10, 12 caused by friction forces generated therebetween.

In the valve housing 2, a valve cylinder 40 is formed across the outlet passage 31 and a packing member 41 is secured at one end of the cylinder 40 for closing the same. First and second piston members 42, 43 are slidably fitted in valve cylinder 40 at each of the sides of the outlet passage 31, and a coil spring 44 having a diameter just smaller than that of the cylinder 40 is provided between the first and second piston members across the outlet passage 31, and therefore, both piston members are positioned at each of the cylinder. The left end chamber of the valve cylinder 40, separated by the first and second piston members 42, 43 from the right end chamber, is connected with the annular recess 6 through a passage 45 and therefore, a pressure generated in the right chamber 1b of the cylinder 1 is applied on the left end surface of the first cylinder member 42. Moreover, the right end chamber of the valve cylinder 40 is connected with the annular recess 7 and, therefore, a pressure generated in the left chamber 1a of the cylinder 1 is applied on the right end surface of the second piston member 43. On the right and left end surfaces of the first and second piston members 42, 43 are respectively provided projections 42a, 43a which face each other and respectively serve to limit the movement in the right and left directions of the first and second piston members 42, 43.

The operation of the above-mentioned embodiment of the present invention is as follows:

In the case where the steering handle is neutrally disposed, the first and second flap-valve members 10 and 12 are positioned at the neutral portions of the valve chambers 8 and 9, and therefore the fluid supplied from the inlet port 3 to the valve chamber 8 through the passage 30 is equally distributed to the inlet openings 8a and 8b and is returned to the outlet port 4 through the outlet openings 9a and 9b, the valve chamber 9 and the outlet passage 31. Thus, the pressure of the fluid in the chambers 1a and 1b of the cylinder is not increased and therefore the steering tires are maintained at neutral positions thereof. Accordingly, the fluid passing through the outlet passage 31 is not restricted by the coil spring 44 because only the compressive force of the spring 44 acts on the first and second piston members 42 and 43, whereby these members are positioned each in their rearwardly displaced positions, that is, because the coil spring 44 is expanded, and thus the clearance between each of the windings of the spring 44 are large.

In the case that the steering handle is rotated in a clockwise direction, that is, the steering shaft 13 is rotated in a clockwise direction, as seen in FIGS. 2 and 3, the first torsion bar 22a of the double torsion bar 22 is twisted because of the resistance force between the tires and the road which acts upon the screw shaft 21, and the steering shaft 13 and the flap valve member 10 are rotated relative to the valve body 5. Thus, the valve seats 10b of the first flap valve member 10 shut the inlet openings 8b and, on the contrary, the inlet openings 8a are more largely opened so as to alter the distribution of the pressurized fluid. At the same time, the second flap valve member 12 and the valve seats 12b thereof are shifted so as to shut the outlet openings 9b and, on the contrary, the valve seats 12a are shifted so as to open the outlet openings 9a.

When the valve seats 10b of the first flap valve member 10 completely shut the inlet openings 8b in accordance with contact of the valve seats 10 being made to the walls of the valve body, the second torsion bar 22b of the double torsion bar 22 is further twisted and therefore, the second flap valve members 12 are rotated so as to further serve to close the outlet openings 9b. Accordingly, the pressure of the fluid supplied to the inlet port 3 is increased because the fluid is only supplied to the inlet openings 8a and, on the contrary, the exhausting fluid through the outlet openings 9b, which are connected with the openings 8a, are then restricted by the valve seats 12b. Thus, presurized fluid supplied to the inlet openings 8a is supplied into the chamber 1b of the cylinder 1 through the annular recess 6 and the passage 35 and therefore, the piston 25 is actuated in a left hand direction and the fluid in the left chamber 1a of the cylinder is returned to the outlet port 4 through the outlet openings 9a, where the hydraulic resistance or restriction is small. As mentioned before, since a small steering force of an operator is amplified owing to the power of the hydraulic cylinder 1, the steering tires can be easily and lightly deflected.

In this case, in conventional devices having second flap valve members 12, cavitation is apt to occur around the valve seats 12b and the cavity of air and a restriction noise are generated, because the highly pressurized fluid is jetted from the opening 9b into the valve chamber 9 in which the fluid of low pressure exists since the chamber 9 is directly connected with the outlet port 4 in such conventional devices. That is to say, the air contained in the highly pressurized oil is turned into a gaseous state cavity at the circumference of the valve seats 9a, 9b because the pressure of the oil becomes extremely lowered in this region. However, in the present invention, when the pressure in the right chamber 1b of the cylinder is increased, the first piston member 42 slidably fitting in the valve cylinder 40 is shifted toward the right against the force of the coil spring 44 till the projection 42a thereof contacts the projection 43a of the other piston member 43, as shown in FIG. 4, because the left end of the valve cylinder 40 is connected with the right chamber 1b through the passage 45. Thus, the coil spring 44 is compressed and the distances between each of the windings thereof becomes small, and as a consequence, the area of the outlet passage 31 is partly decreased. Accordingly, a back pressure is generated in the valve chamber 9 since the fluid flowing out from the valve chamber 9 to the outlet port 4 is restricted by the coil spring. Accordingly, no negative pressure is generated around the valve seats 12b when the fluid is jetted into the chamber 9 through the little clearance between the valve seats 12b and the wall of the valve body 5 because of the back pressure, and therefore, the cavitation and the noise problems can thereby be prevented.

Further speaking, the fluid exhausting throuh the coil spring 44 is first restricted by the narrow clearance of the coil spring at the upper stream thereof, and enters into a center room formed in the coil spring 44 serving as an accumulator, and thereafter is restricted once again by the clearance of the coil spring at the lower stream of th exhausting fluid. Thus, the fluid pressure is gradually decreased and the noise generated by the exhausting fluid can be effectively and extremely decreased. Moreover, as the stream line of the fluid passing through he coil spring 44 is not so suddenly changed, the generation of cavitation can be prevented.

In the case where the steering handle is rotated in a counter-clockwise direction, the first flap valve members 10 shut the inlet openings 8a and the inlet openings 8b are opened for introducing the fluid, and furthermore, the outlet openings 9a are shut by the second flap valve members 12. Accordingly, the pressurized fluid being supplied to the inlet openings 8b is shifted toward the right, as seen in FIG. 1. Thus, the steering tires are directed to the left. In this case, as the pressure of the right chamber of the valve cylinder 40 is increased in response to the increment of the pressure in the cylinder 1a through the annular recess 7 and the passage 46 opening thereto, the second piston member 43 is moved leftwardly and the coil spring 44 is compressed. Thus, the back pressure is generated in the valve cylinder 9, as described with reference to the reverse situation.

In the embodiment just described, the first and second piston members 42 and 43 are provided opposite to each other at both sides of the outlet passage. However, a modification thereof is shown in FIG. 6, in which first and second valve cylinders 50 and 51 are formed in the valve housing 2 in parallel relationship with each other and being perpendicular to the outlet passage 31, and first and second piston members 52 and 53 are respectively slidably fitted therein. In this case, first and second coil spring 56 and 57 are respectively provided across the outlet passage 31 between the first and second piston members 52 and 53 and packing members 54 and 55, which respectively serve to sealingly close and form the valve cylinders 50 and 51. The left end portion of the first valve cylinder 50 is connected with the annular recess 6 through a passage 58, and the left end portion of the second valve cylinder 51 is connected with the annular recess 7 through a passage 59. Thus, when the pressure in the cylinder chamber 1b is increased by rotation in the clockwise direction of the steering handle, the first piston member 52 is shifted toward the right hand direction and, as a consequence, the coil spring 56 is compressed, whereby back pressure is generated in the valve chamber 9. On the contrary, when the steering handle is counterclockwisely rotated and the pressure in the left chamber 1a of the cylinder 1 is increased, the second piston 53 is moved toward the right direction to compress the coil spring 57, and therefore, back pressure is generated in the valve chamber 9.

Furthermore, as shown in FIG. 7, the invention can be modified by making the foregoing piston members in the form of a stepped piston member 62 having first and second piston members 62b and 62a integrally formed therein. Thus, a stepped valve cylinder 60 is formed across the outlet passage 31 and a packing member 61 is provided at one end of a large bore 60a of the valve cylinder 60 for sealingly defining the valve cylinder. The stepped piston member 60 is slidably provided in the valve cylinder 60 and the first and second piston members 62a and 62b are respectively fitted in the small and large bores 60b and 60a of the valve cylinder 60. In the large bore 60a of the valve cylinder 60, a coil spring 64 is provided between the stepped piston member 62 and the packing member 61 across the outlet passage 31. Moreover, the valve chamber 60 is connected with the annular recesses 6 and 7 through passages 65 and 66, respectively, which are opened to the ends of each of the first and second piston members 62b and 62a. Thus, it is clear that the back pressure is generated in the valve chamber 9 when the steering handle is rotated and the pressure in the left or right chamber 1a or 1b is increased, because the piston member 60 is rightwardly moved thereby and therefore the coil spring 64 is compressed. Accordingly, the same effect as that of the foregoing embodiments can be obtained with this modification.

In addition, it is to be noted that the vibration characteristics of the left chamber 1a of the cylinder is apt to be different from that of the right chamber 1b thereof because the capacities or volumes of the left and right chambers of the cylinder of the power steering device are different from each other. However, in the present invention, it is possible to positively prevent the generation of restriction noise by the construction of first and second piston members which have different pressure receiving areas so as to restrict the exhausting fluid by different pressures generated in the left and right chambers of the cylinder since the condition of generation of restriction noise is different according to the case whether the steering handle is rotated in a clockwise or counter-clockwise direction.

FIGS. 8 and 9 show still another embodiment of the present invention. The construction thereof is almostly similar to that of the embodiment shown in FIG. 4, but only one piston member 70 is slidably provided in the valve cylinder 40 for compressing a restrictor coil spring 71 across the exhaust passage 31. The left end of the valve cylinder 40 is connected to the inlet passage 30. Thus, it is clear that back pressure can be generated in the valve chamber 9 because when the steering handle is rotated in a clockwise or counter-clockwise direction, the piston member 70 is moved toward the right direction by the pressurized fluid generated in the passage 30 and the coil spring 70 is compressed. Accordingly, in the above noted embodiment, the same restriction effect of the coil spring can also be expected.

In addition, it is to be noted that there is no wasteful power loss nor variation in the fluid temperature at an unload time, that is, when the steering handle is maintained at the neutral position thereof, because the coil spring as the restrictor expands and therefore the distances between each of the windings of the coil spring are respectively large and there is little restriction effect.

Obviously, many modifications and variations of the present invention are possible in light of the foregoing teachings. It is therefore to be understood that within the scope of the appended claims, the invention may be practiced otherwise than as specifically described herein.

What is claimed as new and desired to be secured by Letters Patent of the United States is:

1. In a power steering device having a hydraulic power cylinder means serving to actuate steering tires and a servo-valve means connected to said hydraulic power cylinder means serving to distribute fluid under pressure to said hydraulic power cylinder means in response to the movement of a steering handle, said servo-valve means having inlet and outlet passages respectively connected with a hydraulic source and a reservoir, the improvement comprising:
   piston member means slidably mounted in valve cylinder means provided across said outlet passage;
   coil spring means provided in said valve cylinder means across said outlet passage, said coil spring means being compressible by said piston member means for restricting fluid flow through said outlet passage; and
   means for moving said piston member means for compressing said coil spring means when said steering handle is actuated.

2. A power steering device according to claim 1, wherein said piston member means comprises first and second piston members and said coil spring means is disposed therebetween, and wherein one of the ends of said first and second piston members is respectively subjected to the pressure in opposing cylinder chambers of said hydraulic power cylinder means through first and second passages for moving the same when the pressure in one of said cylinder chambers is increased.

3. A power steering device according to claim 2, wherein at least one of said first and second piston members has a projection serving to limit the movement of said first and second piston members for defining the compressing amount of said coil spring means.

4. A power steering device according to claim 1, wherein the diameter of said valve cylinder means is larger than the outer diameter of said coil spring means by a predetermined small amount.

5. A power steering device according to claim 1, wherein said valve cylinder means comprises first and second valve cylinders respectively provided across said outlet passage for slidably receiving a first and a second piston member, and said coil spring means comprises first and second coil springs provided respectively in said first and second valve cylinders across said outlet passage, and one end of each of said piston members is respectively subjected to the pressure in opposing chambers of said hydraulic power cylinder means for moving the same and compressing one of said first and second coil springs when the fluid pressure in one of opposing cylinder chambers is increased, whereby the fluid through said outlet passage is restricted by one of said first and second coil springs when the steering handle is actuated.

6. A power steering device according to claim 1, wherein said piston member means is a stepped piston member and the stepped end surfaces thereof are respectively subjected to the pressure in opposing cylinder chambers of said hydraulic power cylinder means for moving the same and compressing said coil spring means to restrict the fluid flow through said outlet passage.

7. A power steering device according to claim 1, wherein said piston member means is a single piston member and one end thereof is subjected to the pressure in said inlet passage for moving the same so as to compress said coil spring means when the pressure in the inlet passage is increased.

8. A power steering device according to claim 7, further comprising means for stopping the movement of said piston member for limiting the compressing amount of said coil spring means.

* * * * *